M. N. Ward,
Grapple,
Nº 84,780. Patented Dec. 8, 1868.
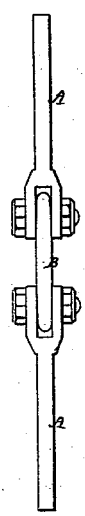
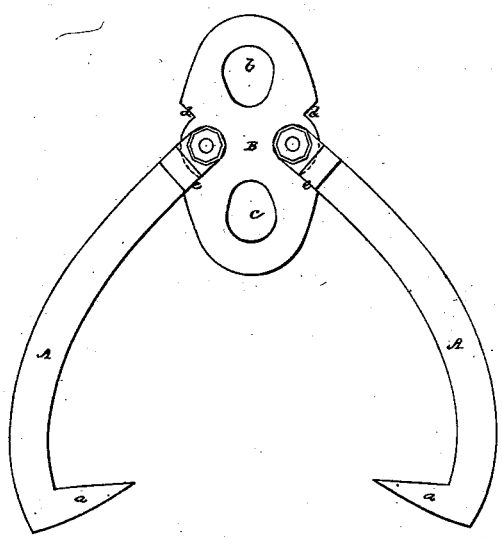
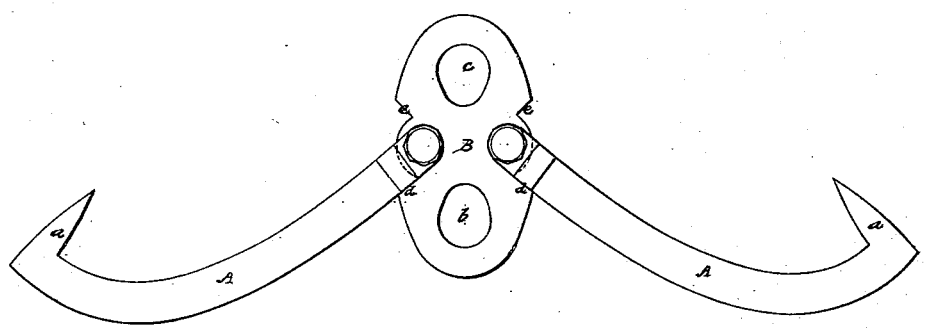
Witnesses  Moses N. Ward

United States Patent Office.

MOSES N. WARD, OF BANGOR, MAINE, ASSIGNOR TO HIMSELF, BENJAMIN S. GRANT, AND THOMAS HERSEY, OF SAME PLACE.

Letters Patent No. 84,780, dated December 8, 1868.

IMPROVEMENT IN TIMBER-GRAPPLE.

The Schedule referred to in these Letters Patent and making part of the same.

*To all persons to whom these presents may come:*

Be it known that I, MOSES N. WARD, of Bangor, in the county of Penobscot, and State of Maine, have made a new and useful invention having reference to Timber-Grapples; and do hereby declare the same to be fully described in the following specification, and represented in the accompanying drawings, of which—

Figure 1 is a top view, and

Figure 2, a side elevation of a grapple containing my improvement.

An ordinary timber-grapple usually consists of two toothed, levers, crossing one another as do the blades of shears, and having a common pivot or fulcrum, they being so arranged as to readily slip by each other.

The grapple represented in the accompanying drawings has two curved arms, A A, which, at their lower ends, are provided with teeth, prongs, or points, $a\ a$, projecting from them, as shown. These arms at their upper ends are pivoted or jointed to the middle of an oval plate, B, provided with two holes or eyes $b\ c$, extended through it. One of these holes is above and the other below the junctions of the arms with the plate.

At such junctions, the plate is notched or constructed with shoulders $d\ d,\ e\ e$, they being arranged in manner as represented. Each pair of these shoulders is to support the grappling-arms in the nearest positions in which it may be desirable for them to approach each other, when the grapple is suspended by a hook or line extended through either of the eyes $b\ c$.

The improved grapple, made in manner as shown in the drawings, and as above described, may be used with either eye upward, its prongs or toothed arms, when one eye is upward, taking the positions as shown in fig. 2. When, however, the plate B is reversed, so as to bring the other eye upward, the arms, with their prongs, will assume the positions shown in fig. 3. When the arms are in these latter positions, the grapple can be used for seizing two logs at once, by being passed underneath them, or against their ends, in order to raise or move them simultaneously.

This feature of the grapple, which is not incident to any other known to me, and which is due to its double-eyed and shouldered plate, is new I believe, and renders the grapple more advantageous to loggers and others than the common grapple, as above mentioned. Besides, the arms when in such position may be employed as hooks to support articles while being raised from the hold of a vessel, or from one loft or floor of a building to another.

By making the eye-plate B with shoulders to support the arms, so as to prevent their points from approaching too near together, or overlapping, the arms, when dropped downward on a log, will readily open so as to span it.

What I claim, is—

The combination and arrangement of the double-eyed and shouldered plate B, made substantially as described, with the two pronged arms A A pivoted to such plate, as set forth.

MOSES N. WARD.

Witnesses:
R. H. EDDY,
F. P. HALE, Jr.